(12) United States Patent
Perry et al.

(10) Patent No.: US 7,143,995 B2
(45) Date of Patent: Dec. 5, 2006

(54) MOTORIZED CAM ACTUATOR

(75) Inventors: Robert B. Perry, Leicester, NY (US); Joseph G. Spakowski, Rochester, NY (US); Todd P. Geib, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 265 days.

(21) Appl. No.: 10/954,713

(22) Filed: Sep. 30, 2004

(65) Prior Publication Data

US 2006/0065871 A1    Mar. 30, 2006

(51) Int. Cl.
*F16K 31/44*    (2006.01)
(52) U.S. Cl. ..................................... 251/251
(58) Field of Classification Search .................. 251/251
See application file for complete search history.

(56) References Cited

U.S. PATENT DOCUMENTS

| | | | | |
|---|---|---|---|---|
| 3,030,740 A * | 4/1962 | Greening | ..................... | 451/124 |
| 3,171,472 A * | 3/1965 | Bauer | ........................ | 165/303 |
| 3,230,847 A * | 1/1966 | Gregory, Jr. et al. | ....... | 396/242 |
| 3,724,752 A * | 4/1973 | Andres et al. | ................ | 236/86 |
| 3,916,746 A * | 11/1975 | Stroobants | .................... | 83/666 |
| 4,298,031 A * | 11/1981 | Genini | ...................... | 139/55.1 |
| 4,745,820 A * | 5/1988 | Benshoff et al. | .............. | 74/107 |
| 4,747,549 A * | 5/1988 | Balzarotti | ................ | 242/366.2 |
| 6,176,254 B1 * | 1/2001 | Choi | .......................... | 137/334 |
| 6,206,043 B1 * | 3/2001 | Griswold et al. | ...... | 137/625.44 |
| 6,343,615 B1 * | 2/2002 | Miller et al. | ................ | 137/202 |
| 6,591,452 B1 * | 7/2003 | Jacquin | ....................... | 16/332 |
| 6,705,262 B1 * | 3/2004 | Battlogg | .................. | 123/90.26 |

\* cited by examiner

*Primary Examiner*—J. Casimer Jacyna
(74) *Attorney, Agent, or Firm*—Paul L. Marshall

(57) ABSTRACT

A motorized cam actuator for linear actuation of an apparatus. An actuating motor shaft is fitted with a bushing having first and second opposed flats and a threaded portion at an outer end thereof. With the motor mounted to a pedestal, the bushing is rotated on the shaft to a predetermined angular position such that assembly stack up is cancelled. The bushing is then fixed to the shaft by welding. A cam with a central opening is mounted onto the bushing, the opening having flats for mating with the flats on the bushing. The cam is mounted onto the bushing and is secured thereto by a nut. This arrangement eliminates any relative motion between the bushing and the motor shaft and prevents stress on the weld joint from reaching failure levels.

14 Claims, 2 Drawing Sheets

MOTORIZED CAM ACTUATOR

TECHNICAL FIELD

The present invention relates to cams operated by a rotary shaft; more particularly, to a rotary cam for positively controlling the forth and back motions of a reciprocating shaft; and most particularly, to an improved method and apparatus for attaching a cam to a motor shaft in a motorized cam actuator.

BACKGROUND OF THE INVENTION

It is well known in the art of internal combustion engines to provide for recirculation of a portion of the engine exhaust back into the engine intake to reduce combustion temperatures, reduce formation of unwanted deposits, reduce formation of $NO_x$ and $SO_x$ compounds, and improve fuel economy. Typically, a pintle valve is disposed between ports in the exhaust manifold and the intake manifold and is actuated by a linear solenoid actuator. In a typical application, the energized solenoid displaces the pintle shaft in either a valve-opening or valve-closing motion, and the reverse motion is carried out by a spring when the solenoid is de-energized.

In some known applications, it is desirable to control the motion of the pintle shaft in both directions. This may be conveniently achieved by driving the pintle shaft with a rotary cam driven by a motor, for example, a stepper or other discrete-motion motor. Correct operation of the valve requires that the cam be rigidly attached to the motor shaft in a position that cancels out the position and orientation assembly tolerance stackup.

The cam position is critical for a number of reasons. The motor and sensor package has only 90° of nominal usable rotation, and a portion of that arc is taken up by other apparatus so that the actual usable rotation is less than 90°. The cam profile must use as much as possible of the actual rotation available in order to translate the rotational motion to linear motion with appropriate force characteristics.

In the prior art, a single laser weld is used to attach the cam to the motor shaft after the cam position and orientation is established with reference to a datum on the assembly housing. This attachment meets an accepted standard for vibrational robustness when tested against a standard vibration schedule. However, this attachment can fail when subjected to a vibration schedule for severe duty, as may be experienced in use on tractors and similar machines.

Analysis of severe-duty failures shows that the weld fails because of fatigue in the heat affected zone on the motor shaft near the fusion zone. FEA analysis shows the stress due to vibrational effects is too high for the joint geometry and therefore supports the empirical failure data.

What is needed in the art is an improved method and apparatus for inexpensively fixing a cam onto a rotary shaft such that the cam remains fixed to the shaft during severe duty.

It is a principal object of the present invention to attach a cam to a rotary shaft in such a way that a) position and orientation tolerance stackup is cancelled, and b) the cam remains fixed to the shaft during severe duty.

SUMMARY OF THE INVENTION

Briefly described, in a motorized rotary cam actuator in accordance with the invention, the outer end of an actuating motor shaft is fitted with a special bushing having first and second opposed flats and a threaded portion at an outer end thereof. After the motor is mounted to a motor pedestal, the bushing is rotated on the shaft to a predetermined angular position with respect to the motor pedestal such that mechanical assembly stack up is cancelled. The bushing is then fixed to the shaft as by crimping or other means and is also permanently attached thereto as by a weld between the bushing and the motor shaft. A cam is provided with a central opening for mounting onto the bushing, the opening having first and second flats formed at a predetermined angular position with respect to the cam lobe, for mating with the flats on the bushing. The cam is mounted onto the bushing and is secured thereto by a nut.

With this joint design, the high stress of the vibration energy is kept from the weld by the fact that the bushing crimp makes contact with the motor shaft inboard of the weld, thereby eliminating any relative motion between the bushing and the motor shaft and preventing stress on the weld joint from reaching failure levels.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 2:
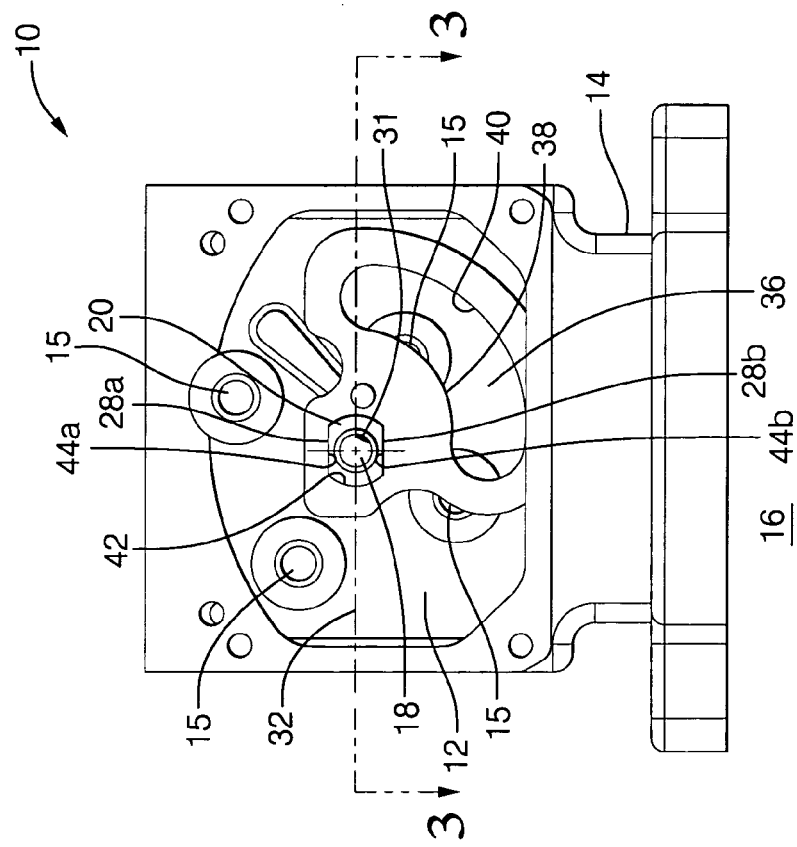
FIG. 2 is a front elevational view of the motorized cam actuator shown in FIG. 1.
Figure 1:
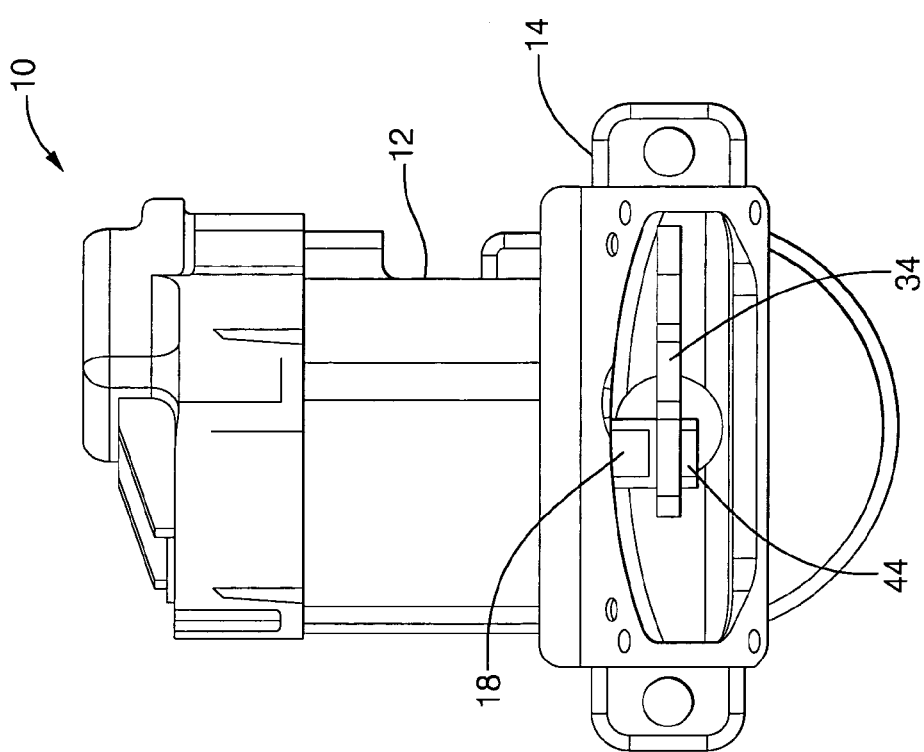
FIG. 1 is a plan view of a motorized cam actuator in accordance with the invention.
Figure 3:
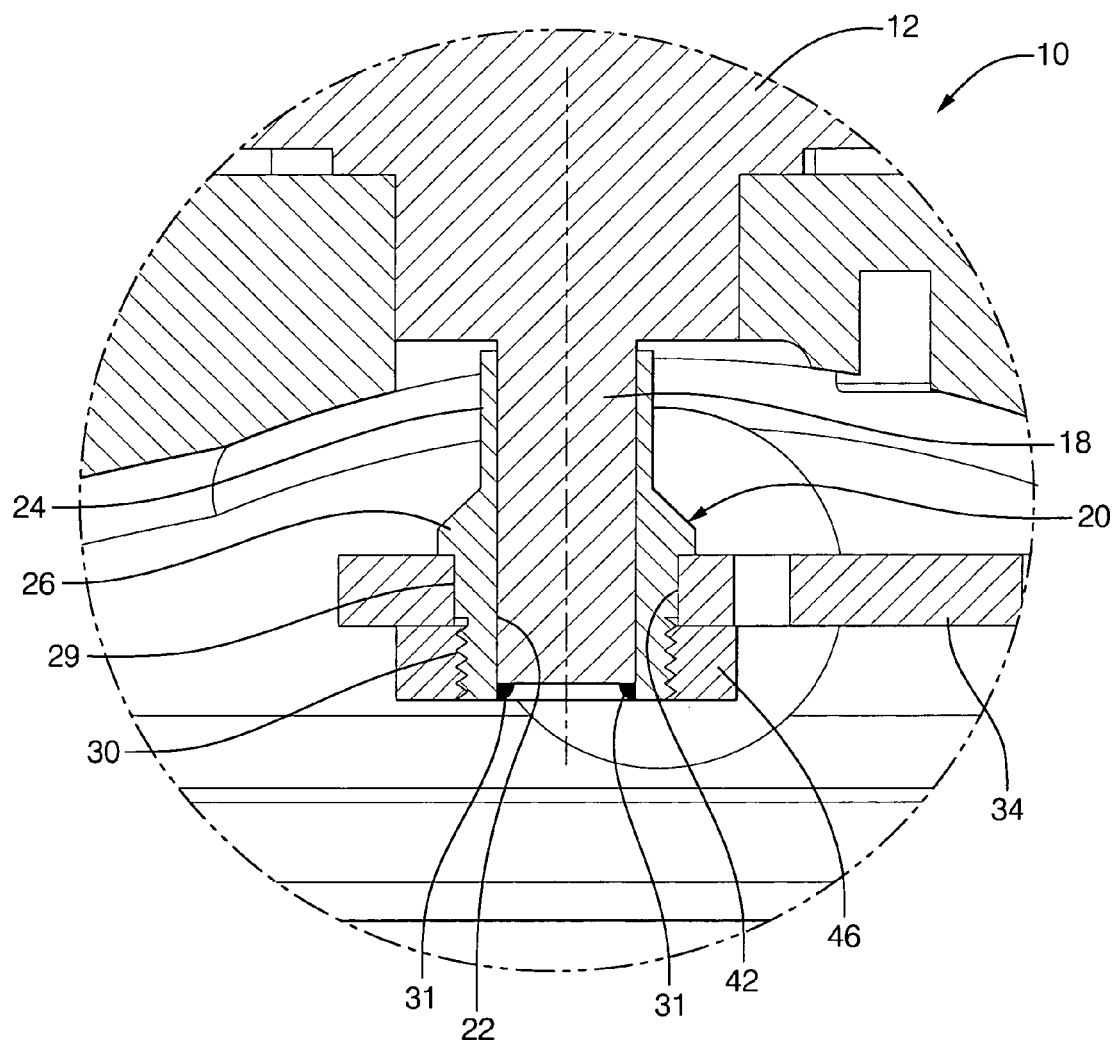
FIG. 3 is a detailed view of a central portion of a cross-sectional view taken along line 3—3 in FIG. 2.

Referring to FIGS. 1 through 3, a motorized cam actuator 10 in accordance with the invention includes an actuating motor 12 and a motor pedestal 14 for receiving motor 12 and for connecting assembly 10 to an apparatus 16 to be actuated, for example, the pintle of an exhaust gas recirculation valve for an internal combustion engine. Motor 12 is an intermittent motion motor such as a stepper motor, as is known in the prior art.

A motor shaft 18 extends from the rotor of motor 12 for receiving a close-fitting bushing 20 having an axial bore 22. Bushing 20 includes an inner easily-crimped necked portion 24 and an outer portion 26 having first and second opposed flats 28*a*, 28*b* on an intermediate region 29, and a threaded region 30.

During assembly, after motor 12 is mounted to pedestal 14 by bolts 15 and with motor shaft 18 in its default rotary position, bushing 20 is rotated on shaft 18 to a predetermined angular position with respect to a reference 32 on the pedestal 14 such that mechanical assembly stack up is cancelled. An arbitrary but useful convention is that flats 28*a*, 28*b* are parallel with a reference line 32 on pedestal 14. Bushing 20 is then fixed to the shaft as by crimping or other means in region 24 and preferably is also permanently attached thereto as by a weld or welds 31 between the bushing and the motor shaft. Thus the bushing is made an integral, specialized end of the motor shaft.

A cam 34 is formed preferably by stamping from sheet metal stock. Cam 34, for example, includes a slot 36 eccentric about a central opening 42 and having an inner edge 38 and an outer edge 40 for engaging a roller end (not shown) of a linearly reciprocable shaft (also not shown) such as a pintle shaft for apparatus 16. Central opening 42 is provided for mounting cam 34 onto region 29 of bushing 20. Opening 42 includes first and second cam flats 44a, 44b formed at a predetermined angular position with respect to slot 36 such that when the cam is mounted on the motor shaft the slot is in the proper angular orientation for actuation of apparatus 16. Cam 34 is mounted onto bushing 20 and is secured thereto by nut 46 on threaded region 30.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A motorized cam actuator, comprising:
   a) a motor having a motor shaft;
   b) a cam mounted on said motor shaft for rotation thereby, said cam having an opening for receiving said motor shaft, said opening including at least one first axial flat portion; and
   c) a bushing disposed between said motor shaft and said cam, said bushing having an axial bore for receiving said motor shaft and an outer surface for receiving said cam opening, said outer surface including at least one second axial flat portion for mating with said first axial flat portion to orient said cam on said bushing.

2. An actuator in accordance with claim 1 comprising a plurality of said first axial flat portion and a plurality of said second axial flat portion.

3. An actuator in accordance with claim 1 further comprising a motor pedestal for receiving said motor and for mating with an apparatus to be actuated by said actuator.

4. An actuator in accordance with claim 3 wherein said apparatus is a pintle valve.

5. An actuator in accordance with claim 4 wherein said pintle valve is an exhaust gas recirculation valve for an internal combustion engine.

6. An actuator in accordance with claim 4 wherein said cam includes a slot eccentric about said motor shaft and having an inner edge and an outer edge for engaging a pintle shaft of said pintle valve.

7. An actuator in accordance with claim 3 further comprising a reference mark on said motor pedestal, wherein said at least one first axial flat portion and said at least one second axial flat portion are in a predetermined angular relationship to said reference mark when said motor is in a default position.

8. An actuator in accordance with claim 7 wherein said at least one first axial flat portion and said at least one second axial flat portion are parallel to said reference mark.

9. An actuator in accordance with claim 1 wherein said bushing is attached to said motor shaft at a first location along said shaft and at a second location at the end of said motor shaft.

10. An actuator in accordance with claim 9 wherein said attaching at a second location is carried out by means of welding.

11. An actuator in accordance with claim 1 wherein said bushing includes a threaded portion at an outer end thereof, and wherein said cam is secured to said bushing by a nut engaged onto said threaded portion.

12. An actuator in accordance with claim 1 wherein said motor is an intermittent motion motor.

13. An actuator in accordance with claim 12 wherein said intermittent motion motor is a stepper motor.

14. A method for assembling an actuator having a motor with a motor shaft; a pedestal for receiving the motor, the pedestal having a reference mark; a cam having an opening with a first axial flat portion for receiving the motor shaft; and a bushing disposed between the motor shaft and the cam, the bushing having an axial bore for receiving the motor shaft and having an outer surface having a second axial flat portion for receiving the cam; the method comprising the steps of:
   a) attaching said motor to said pedestal with said motor shaft projecting therefrom, said motor being in a default position of angular rotation;
   b) sliding said bushing onto said motor shaft;
   c) rotating said bushing on said motor shaft until said second angular flat portion is in a predetermined angular relationship to said reference mark on said pedestal;
   c) fixing said bushing to said motor shaft;
   d) sliding said cam onto said outer surface of said bushing wherein said first axial flat portion of said cam engages said second axial flat portion of said bushing; and
   e) fixing said cam to said bushing.

* * * * *